United States Patent Office 3,681,283
Patented Aug. 1, 1972

3,681,283
WASTE TREATMENT WITH NUCLEOPROTEIN FLOCCULATING AGENT
Mao H. Yueh, Minneapolis, Minn., assignor to General Mills, Inc.
No Drawing. Continuation-in-part of applications Ser. No. 752,758 and Ser. No. 752,759, both Aug. 15, 1968. This application Sept. 2, 1970, Ser. No. 69,118
Int. Cl. C02b 1/20
U.S. Cl. 210—47                      13 Claims

ABSTRACT OF THE DISCLOSURE

A flocculating agent is disclosed including nucleoprotein material which is treated with an organic or inorganic salt. The flocculation agent is used to remove suspended organic and/or inorganic waste materials from water.

BACKGROUND OF THE INVENTION

This application in a continuation-in-part of U.S. patent applications Ser. No. 752,758, now abandoned, and Ser. No. 752,759, both filed Aug. 15, 1968.

The present invention relates to waste treatment and more particularly it relates to waste treatment using a flocculating agent.

A large number of natural and synthetic materials have been used in the past for treatment of organic and inorganic wastes. Examples of natural materials include agar, alum, guar gum, glue, gelatin, starch, microbial polysaccharides and modified cellulose derivatives. Examples of synthetic materials include polyacrylamides, polymethacrylic acid, polyethylene imine and polyvinyl pyrrolidone. The materials are typically added to the aqueous medium which contains waste and flocculation takes place. The present invention provides an improved flocculating agent, namely, a nucleoprotein material which is treated with an inorganic or an organic salt.

Typical examples of waste materials that may be treated according to the present invention include various suspended inorganic and organic wastes such as those produced by industrial plants, i.e. phosphatic slimes, silica, taconite tailings, soybean wastes, sewage sludge, clay and soil and the like.

The nucleoprotein containing material is treated by dispersing in an aqueous medium along with water soluble organic or inorganic salts, especially soaps and anionic detergents. The salts appear to at least partially solubilize the otherwise insoluble nucleoprotein materials. In so doing, it is theorized that the deoxyribonucleoprotein unwinds and swells, thus generally forming a viscous sol. The nucleoprotein material used in the present invention may be obtained from any substance having a substantial amount of nucleoprotein present, preferably avian blood, microbial material or fish milt. Other sources would include wheat germ and various organ tissue such as thymus, spleen, pancreas and liver obtained from calves or testes obtained from bulls. For purposes of economics and ease in preparation, the substance preferably contains at least 0.5% nucleoprotein, by weight. As used herein, the term "nucleoprotein material" and "nucleoprotein containing material" will mean a material containing at least 0.5% nucleoprotein.

The nucleoprotein material may be treated in various ways for purposes of stabilization, purification and concentration. The material may be heated and/or treated with a lower aliphatic alcohol to deactivate enzymes. The material may be treated to remove cell walls and to obtain uniform size and homogeneity such as in a blender or mixer. The material may be chemically treated to break open the cells, for example with detergents and organic salts. The material may be concentrated or dehydrated by conventional techniques such as vacuum, drum, tray, freeze drying and the like.

The nucleoprotein containing material can be heated to effect at least partial enzyme deactivation. Where the heating temperatures are high—i.e. 90° C. or above— the treatment times should be short, for example, about 1 to 10 seconds at 104° to 116° C. Where the heating temperatures are below about 90° C.—i.e. about 50° to 90° C.—the treatment can be carried out for from a few minutes to an hour or more—i.e. about 5 minutes to two hours. It has been found that the above heat treatments are effective in extending the useful life of the nucleoprotein material and of the resulting flocculating agent. However, care must be exercised to prevent the denaturization of the material—i.e. the deoxyribonucleoproteins. Additionally, the heat treatment does not ordinarily completely deactivate the enzymes. Thus the nucleoprotein material and resulting flocculating agent are still subject to deterioration after reasonable storage periods. It is especially preferred to treat the nucleoprotein material with a lower aliphatic alcohol of 1 to about 5 carbon atoms. Especially preferred alcohols are methanol, ethanol and isopropanol. The nucleoprotein material can be dispersed in the alcohol and then recovered. It is preferred to use from about 2 to about 20 volumes of the alcohol based on the volume of the nucleoprotein material. From an economic standpoint, the use of about 2 to about 10 volumes is especially preferred. The alcohol can be cold or heated to as high as its boiling point in the case of methanol, ethanol and isopropanol, or to about 90° C. in the case of the alcohols having boiling points above such temperature.

The nucleoprotein material used in the present invention may be avian blood erythrocytes or a fraction obtained from avian blood erythrocytes by processing in various ways to increase the concentration of deoxyribonucleoprotein and correspondingly reduce color. This procedure is carried out by hemolyzing the erythrocytes thus releasing the hemoglobin. Various hemolyzing agents can be employed to rupture the cell walls of the erythrocytes. A preferred such agent is saponin which can be employed in low concentrations—i.e. from about 0.01 to 1.9% by weight based on the dry weight of the erythrocytes. After the hemolysis is completed, the solids can be washed, preferably with water or dilute aqueous NaCl solutions to remove the soluble materials and especially the hemoglobin.

The erythrocytes per se or any fraction thereof can also be treated with a lower aliphatic alcohol of from 1 to about 5 carbon atoms. Such treatment tends to deactivate enzymes and other microorganisms, thus preventing deterioration. Additionally, the blood from which the erythrocytes are obtained can be treated with heparin and/or sodium citrate to prevent clotting and thus facilitate the separation of the erythrocytes from the plasma. The erythrocytes, or fractions thereof, can be dehydrated by conventional techniques—i.e. vacuum, drum, tray, freeze drying and the like.

The nucleoprotein material of the present invention typically may be a microorganism such as *Xanthomonas campestris* NRRL–B1459, *Xanthomonas campestris* var. *alfalfae*, *Agrobacterium tumefacieus* NRRL–836, *Escherichia coli*, ATCC 11775, *Aerobacter aerogenes*, *Alcaligenes faecalis* ATCC 337, *Bacillus subtilis* var. *natto*, *Erwinia cartovoria*, *Bacillus cereus*, *Escherichia coli* strep resistant, *Klebsiella* sp., *Micrococus citreus*, *Proteus vulgaris*, *Pseudomonas aeroginosa*, *Sarcina lutia*, *Serratia marcesceus*, *Streptococcus liquefacieus* and the like. The microorganisms may be fresh and are preferably separated from their growing medium such as by centrifugation. If the microorganisms are to be stored prior to being salt treated, they may be frozen or dried using conventional drying techniques such as vacuum, drum, tray, freeze drying and the like. If desired, the microorganism cells may be washed, for example, using a lower aliphatic alcohol such as methanol, ethanol or isopropanol. The microorganisms may be lysed prior to storing; however, lysing is not essential to such storage.

The nucleoprotein material of the present invention may be fish milt. Fish milt is one of the waste products of the fish processing industry. It is made up primarily of the fish sperm surrounded by connective tissue. Analysis of the milt shows that it contains large amounts— i.e. 90% and more—of deoxyribonucleoprotein wherein the protein is protamine. Normally the milt is combined with other fish wastes and utilized to some extent as a hatchery feed. Some biochemical companies use the milt as a raw material for the preparation of DNA (deoxyribonucleic acid). More often than not, the milt is simply disposed of with the rest of the fish waste products.

The invention is applicable to fresh milt solids as well as milt that has been processed in various ways to inhibit enzyme activity or deterioration. Thus fresh milt, such as salmon milt available for example from Alaskan canneries, can be merely reduced in particle size such as by blending or homogenizing, and then dispersed in water or other suitable aqueous medium which contains, or to which is added, the water soluble salt or surface active agent. However, it is preferred to further process the milt prior to use in the present invention since it deteriorates rather quickly. Additionally, it may be desirable to reduce or eliminate the "fishy" smell of the milt. Sols prepared from the fresh milt solids and certain of the salts, i.e. the soaps, sulfates and sulfonates and especially sodium dodecyl sulfate, have reasonable stability (several months) due apparently to the preservative action of the anionic detergent. Also, it has been found that fresh milt can be preserved by adding small quantities of the sodium salt of ethylene diamine tetracetic acid, sodium arsenate and/or 5-nitrofurfuralsemicarbazone. The use of small quantities of each of these materials is preferred. The fresh milt solids or dry milt solids can also be frozen and then thawed immediately prior to use.

The milt, fresh or preserved with chemical additives as aforementioned, can be dehydrated by conventional techniques—i.e. vacuum, drum, tray, freeze drying and the like. Where the enzymes have been at least partially inactivated, as above described, the dry milt solids can be stored for various periods of time prior to use in the present invention.

Other nucleoprotein containing materials may be used in the present invention, typically including wheat germ and organ tissue such as thymus, spleen, pancreas, liver and testes. The organ tissue may be treated much as described with respect to milt, blood and microbials for purposes of stabilizing and/or concentrating the nucleoprotein material. For example, skin and connective tissue may be removed. The tissue may be finely cut or chopped so that it can be easily and thoroughly dispersed in the aqueous medium. The tissue may be dried using alcohols such as methanol, ethanol or isopropanol.

The nucleoprotein material may be treated by dispersing in an aqueous medium which contains, or to which is added, a water-soluble inorganic or organic salt, such as sodium chloride, the soaps and synthetic anionic detergents—i.e. anionic surfactants. The treated nucleoprotein material will generally form a viscous sol.

Representative soaps are sodium stearate, sodium palmitate and sodium oleate. Representative of the synthetic anionic detergents or surfactants are dioctyl sodium sulfosuccinate and various sulfates and sulfonates, including sodium octyl sulfate, sodium nonyl sulfate, sodium decyl sulfate, sodium undecyl sulfate, sodium dodecyl sulfate, sodium tridecyl sulfate, sodium tetradecyl sulfate, sodium pentadecyl sulfate, sodium hexadecyl sulfate, sodium heptadecyl sulfate, sodium octadecyl sulfate, sodium elyl sulfate, sodium octyl sulfonate, sodium nonyl sulfonate, sodium decyl sulfonate, sodium undecyl sulfonate, sodium dodecyl sulfonate, sodium tridecyl sulfonate, sodium hexadecyl sulfonate, sodium octadecyl sulfonate, sodium decyl benzene sulfonate, sodium dodecyl benzene sulfonate, sodium hexadecyl benzene sulfonate, sodium tri (isopropyl) benzene sulfonate, sodium tri (isobutyl) naphthalene sulfonate and the like.

The nucleoprotein material may be treated by dispersing in an aqueous medium which contains, or to which is added, a water-soluble inorganic salt providing the nucleoprotein material is fish milt. Representative inorganic salts would include sodium chloride, ammonium chloride, sodium sulfate, ammonium sulfate, sodium carbonate and magnesium sulfate.

The aqueous medium may be plain water or it may be water containing other materials, for example, it may be the water which contains the waste material. In other words, the nucleoprotein material may be first treated with the salt in an aqueous medium and then added to the water which contains waste material or the nucleoprotein material may be treated in situ in the water which contains the waste material. The nucleoprotein material is dispersed in the waste containing water in an amount sufficient to produce flocculation of waste materials. Surprisingly, even very small amounts of treated nucleoprotein material will provide satisfactory flocculation and waste treatment. The nucleoprotein material will generally be added in an amount of at least 1 part per million (p.p.m.). The over-all preferred range is from about 1 to 500 p.p.m. based on the total weight of the aqueous medium.

The salts are added in an amount sufficient to treat the amount of nucleoprotein present. This may be an amount sufficient to form a viscous sol. The amount of salts needed varies somewhat depending on the particular salt or salts employed. In this regard, as little as 0.04% by weight of sodium dodecyl sulfate has been found to form a viscous sol from a 0.1% by weight dispersion of nucleoprotein material, the weight percentages being based on the total weight of the aqueous phase. In contrast approximately 6.0% by weight of sodium chloride is needed to form a viscous sol from the same milt solids dispersion. The nucleoprotein material will normally be treated with salt in an amount of at least 10% by weight based on the weight of the nucleoprotein material, generally, at least 40% or more. Of course, excess of the salt or salts can be employed. If the sol or treated nucleoprotein material is added in only small amounts to the waste containing aqueous medium, flocculation will take place without further treatment. However, if larger amounts of sol or nucleoprotein material are added to the aqueous medium, the aqueous medium may become a stable viscous sol and flocculation will not take place. Acidification in this case will result in good flocculation. The pH is preferably about pH 6 or lower, although flocculation in many instances will take place even at a pH above pH 6. The acidification may be produced by adding any acid, typically, hydrochloric acid, sulfuric acid, phosphoric acid and the like, to the aqueous medium. The acid may be added to the nucleoprotein sol prior to adding the sol to the waste containing aqueous medium. The acid may be added to the waste containing aqueous medium prior to adding the sol to the aqueous medium. Alternatively, the acid may be added to the mixture of the nucleoprotein sol and the aqueous medium. In each instance the acidification improves the flocculation.

EXAMPLE I

An industrial waste from a soybean processing plant was collected. The waste contained 11.0% total solids and appeared to be a stable suspension. To 100 milliliters of the waste was added an equal volume of a viscous sol prepared from chicken blood erythrocyte material and sodium dodecyl sulfate. The erythrocyte material was prepared by treating chicken blood with heparin (0.2% by weight to prevent blood coagulation). After centrifugation at 40° F. and 2,000 r.p.m. for 20 minutes, 102.4 ml. of the blood was separated into the supernatant (plasma) and a precipitate of 49.0 ml. (mainly erythrocytes). The precipitate, composed of 69.8% moisture and 30.4% solids, was dispersed in five volumes of ethanol and stirred continuously at room temperature for 30 minutes. After filtration, air drying and grinding, a dark powdery product was obtained. The viscous sol was prepared from 1000 mg. of the dark powdery product, 93 milliliters of water and 7 milliliters of 10% by weight aqueous sodium dodecyl sulfate. After mixing the sol with the waste, about 1.5 milliliters of 6 N HCl was added dropwise to the resulting mixture. The precipitate or flocculate that formed was readily removed by filtration. Analysis of the filtrate showed that over 84% of the suspended solids had been removed.

EXAMPLE II

Industrial waste of the type described in Example I was treated with a viscous sol prepared from fish milt. Frozen, fresh salmon milt was thawed and blended in a Waring Blendor. The blended milt was dispersed in ten volumes of 95% ethanol and brought to boiling. The solids were filtered and washed twice with ten volumes of 95% ethanol, filtered, air dried and ground. The product was creamy white. A viscous sol was prepared by dispersing 100 mg. of the product in 93 milliliters of water. Then 7 milliliters of a 10% by weight aqueous solution of sodium dodecyl sulfate was added with stirring. To 100 milliliters of the waste was added an equal volume of the viscous sol. After mixing, 6 N HCl was added dropwise to the resulting sol with stirring. The flocculate that formed was readily removed by filtration. Analysis of the filtrate showed that 91.8% of the waste solids had been removed.

EXAMPLE III

Approximately 500 grams of clay containing soil was suspended in 3,500 milliliters of tap water. After standing at room temperature for 4 hours, the muddy supernatant was collected by decantation. To 100 milliliters of the supernatant was added 400 milligrams of freshly ground salmon milt and 7 milliliters of a 10% by weight aqueous solution of sodium dodecyl sulfate. Stirring was continued for a few minutes until a thick, viscous sol was obtained. Approximately 0.25 milliliter of 6 N HCl was added in a dropwise manner with stirring. The addition of the acid brought about a complete loss in viscosity and produced floc formation. The suspended clay particles were visibly enmeshed by the floc. The floc was readily removed by filtration.

EXAMPLE IV

Example III was repeated except the dried alcohol treated milt material described in Example II was used. Essentially the same water purification was obtained.

EXAMPLE V

Frozen, fresh salmon milt was thawed and blended in a Waring Blendor. The milt was then dispersed in ten volumes of 95% ethanol and brought to boiling. The solids were filtered and washed twice with ten volumes of 95% ethanol, filtered, air dried and ground. An aqueous dispersion containing 0.1% by weight of the dried milt product was prepared. Six percent by weight NaCl was added. A thick viscous sol was obtained which was suitable for waste treatment according to the present invention.

EXAMPLE VI

Example V was repeated using 0.5, 1.0 and 2.0% by weight Camay® soap in place of the sodium chloride. A viscous sol was obtained which was suitable for waste treatment according to the present invention.

EXAMPLE VII

A phosphatic slime was obtained of the type discharged into setting ponds at Bartow, Fla. The slime was a stable suspension containing about 4 to 5% solids, by weight. The phosphatic slime solids included by weight about 20–25% carbonate fluorapatite, 30–35% quartz, 20–25% montmorillonite, 5–10% attapulgite, 4–6% wavellite, 2–3% feldspar, 2–3% heavy minerals, 1–2% dolomite and up to 1% of various other materials such as kaolinite. The slime was divided into three samples. Sample VII–A was treated with an equal volume of a viscous sol identical to that described in Example II. A few drops of 2 N HCl was added and flocculation took place substantially removing the waste solids. Sample VII–B was treated with an equal volume of a viscous sol substantially identical to that described in Example I except the avian blood was turkey blood. A few drops of 2 N HCl was added and flocculation took place substantially removing the waste solids. The filtrate contained 0.03% solid waste. Sample VII–C was treated with an equal volume of a viscous sol prepared from microbial material. The sol was prepared by adding 5.4396 grams of *Xanthomonas campestris* containing 77.9% moisture to 320 milliliters of water and mixing with 80 milliliters of 10% sodium dodecyl sulfate. After the sol was added to the waste, a couple drops of 2 N HCl were added and flocculation took place. The waste solids were substantially removed.

EXAMPLE VIII

The present invention was used to remove fine taconite tailings which were suspended in water. The taconite suspension was waste obtained from Reserve Mining Co. of Silver Bay, Wis. The waste contained about 1 to 2% suspended solid matter. A sol was prepared which contained, by weight, 0.7% of the creamy white product of Example II, 0.7% sodium dodecyl sulfate and 99.2% water. The taconite suspension was divided into 10 samples. Sample VIII–A was 10 milliliters of the suspension. Samples VIII–B through VIII–I were 10, 20, 30, 40, 50, 60, 70, 80 and 100 milliliters respectively of the suspension. Sample VIII–J was the control suspension and was not treated. Samples VIII–A through VIII–I each received 1 milliliter of the sol and after mixing 1 drop of 6 N hydrochloric acid was added. The nucleoprotein material was present in Sample VIII–I at a level of about 10 parts per million. Flocculation was observed in Samples A through I and after standing the floc settled out leaving the samples clear. The control, Sample J, remained a cloudy suspension.

EXAMPLE IX

A phosphatic slime of the type used in Example VII was treated with lower levels of nucleoprotein and it was found that acidification was unnecessary for flocculation. Samples IX–A through IX–D were each 10 milliliters. To Sample IX–A was added with mixing 1 milliliter of the viscous sol described in Example II. The mixture contained 90 parts per million nucleoprotein. To Sample IX–B was added with mixing 1 milliliter of the viscous sol used with Sample VII–B of Example VII. The mixture contained 90 parts per million nucleoprotein. To Sample C was added with mixing 1 milliliter of the viscous sol used with Sample VII–C of Example VII. The mixture contained 270 parts per million nucleoprotein. To Sample IX–D was added, with mixing, a viscous sol prepared from *Escherichia coli*. The sol was prepared by dispersing 4.3332 grams of the *Escherichia coli* in 93 milliliters of water and adding 7 milliliters of a 10% solution of sodium lauryl sulfate. The Sample IX–D mixture contained 270 parts per million nucleoprotein. In each instance good flocculation was obtained without addition of acid. The samples were each centrifuged at low speed for 3 to 5 minutes and the clear supernatants were decanted.

The embodiments of the invention in which an exclusive property or privilege is claimed are defined as follows:

1. A method for removing suspended solid waste particles from an aqueous medium, said method comprising adding a sol of a material comprised predominantly of nucleoprotein to said aqueous medium, said nucleoprotein being at least partially solubilized, and then flocculating said nucleoprotein, thereby removing the waste particles from the aqueous medium.

2. The method of claim 1 wherein the nucleoprotein is present in the aqueous medium in an amount of between 1 and 500 p.p.m.

3. The method of claim 1 wherein the aqueous medium is acidified thereby flocculating the nucleoprotein.

4. The method of claim 3 wherein the pH of the aqueous medium is about pH 6 or lower.

5. The method of claim 2 wherein the sol is produced by dispersing a nucleoprotein containing material in water and then adding an anionic detergent or a soap.

6. The method of claim 2 wherein the sol is produced by dispersing fish milt in water and adding an inorganic salt.

7. The method of claim 6 wherein the inorganic salt is sodium chloride.

8. The method of claim 5 wherein the nucleoprotein containing material is a member selected from the group consisting of avian blood, microbial material, fish milt, wheat germ, thymus, spleen, pancreas, liver and testes.

9. A method for removing suspended solid organic or inorganic waste particles from an aqueous medium, said method comprising adding a material comprised predominantly of nucleoprotein to the aqueous medium, treating the nucleoprotein material to solubilize nucleoprotein and then flocculating said nucleoprotein thereby removing the waste particles from the aqueous medium.

10. The method of claim 9 wherein the nucleoprotein material is a member selected from the group consisting of avian blood, microbial material, fish milt, wheat germ, thymus, spleen, pancreas, liver and testes.

11. A method for removing waste from an aqueous medium, said method comprising adding a material comprised predominantly of nucleoprotein to the waste containing aqueous medium, said nucleoprotein material being at least partially solubilized, said nucleoprotein material being a member selected from the group consisting of avian blood, fish milt, wheat germ, thymus, spleen, pancreas, liver and testes and flocculating said solubilized nucleoprotein material.

12. The method of claim 11 wherein said nucleoprotein is at least partially solubilized by treatment with an anionic detergent or a soap.

13. The method of claim 1 wherein the nucleoprotein material is a member selected from the group consisting of avian blood, fish milt, wheat germ, thymus, spleen, pancreas, liver and testes.

References Cited

UNITED STATES PATENTS

| | | | |
|---|---|---|---|
| 3,346,463 | 10/1967 | Goren | 210—54 X |
| 3,208,526 | 9/1965 | Patton et al. | 210—51 X |
| 2,609,328 | 9/1952 | Reed | 195—57 |

OTHER REFERENCES

Buswell, A. M.: The Chemistry of Water and Sewage Treatment, 1928, Chem. Catalog Co., N.Y., pp. 203 and 317–322 relied on.

Sawyer, C. N.: Effects of Synthetic Detergents on Sewage Treatment Processes, vol. 30, June 1958, Sewage and Ind. Wastes, pp. 757–768 relied on (P.O.S.L.).

MICHAEL ROGERS, Primary Examiner

U.S. Cl. X.R.

195—57; 210—54; 252—180; 260—112